United States Patent
Lee (10) Patent No.: US 10,984,539 B2
(45) Date of Patent: Apr. 20, 2021

(54) IMAGE DEVICE FOR GENERATING VELOCITY MAPS

(71) Applicant: eYs3D Microelectronics, Co., Taipei (TW)

(72) Inventor: Chi-Feng Lee, Hsinchu County (TW)

(73) Assignee: eYs3D Microelectronics, Co., Taipei (TW)

(*) Notice: Subject to any disclaimer, the term of this patent is extended or adjusted under 35 U.S.C. 154(b) by 0 days.

(21) Appl. No.: 16/502,039

(22) Filed: Jul. 3, 2019

(65) Prior Publication Data
US 2020/0013173 A1    Jan. 9, 2020

Related U.S. Application Data

(60) Provisional application No. 62/693,457, filed on Jul. 3, 2018.

(51) Int. Cl.
| | |
|---|---|
| *G06T 7/55* | (2017.01) |
| *H04N 5/247* | (2006.01) |
| *G06T 7/521* | (2017.01) |
| *G06T 7/246* | (2017.01) |
| *H04N 5/225* | (2006.01) |

(52) U.S. Cl.
CPC ............. *G06T 7/248* (2017.01); *G06T 7/521* (2017.01); *G06T 7/55* (2017.01); *H04N 5/2256* (2013.01); *H04N 5/247* (2013.01); *G06T 2207/10028* (2013.01)

(58) Field of Classification Search
None
See application file for complete search history.

(56) References Cited

U.S. PATENT DOCUMENTS

| | | | | | |
|---|---|---|---|---|---|
| 5,109,425 | A | * | 4/1992 | Lawton | G06T 7/262 348/25 |
| 5,706,417 | A | * | 1/1998 | Adelson | G06T 9/00 345/474 |
| 6,307,959 | B1 | * | 10/2001 | Mandelbaum | G06T 7/55 382/104 |
| 8,866,821 | B2 | * | 10/2014 | Finocchio | G06T 7/269 345/473 |
| 9,041,717 | B2 | * | 5/2015 | Kaschalk | G06T 15/005 345/473 |
| 9,153,035 | B2 | * | 10/2015 | Finocchio | G06T 7/269 |
| 9,428,186 | B2 | * | 8/2016 | Breed | B60W 30/08 |
| 9,900,510 | B1 | * | 2/2018 | Karafin | G06T 7/557 |

(Continued)

*Primary Examiner* — Reza Aghevli
(74) *Attorney, Agent, or Firm* — Winston Hsu (57) ABSTRACT

An embodiment of the present invention provides an image device for generating velocity maps. The image device includes an image capturing group, a depth map generator, an optical flow generator, and a velocity map generator. The image capturing group includes at least one image capturer, each image capturer of the image capturing group captures a first image at a first time and a second image at a second time. The depth map generator generates a first depth map according to the first image and a second depth map according to the second image. The optical flow generator generates first optical flow according to the first image and the second image. The velocity map generator generates a first velocity map according to the first depth map, the second depth map and the first optical flow, wherein the first velocity map corresponds to the first image.

17 Claims, 9 Drawing Sheets

(56) References Cited

U.S. PATENT DOCUMENTS

| | | | | |
|---|---|---|---|---|
| 10,091,409 B2* | 10/2018 | Govindarao | ..... | H04N 5/232945 |
| 10,412,291 B2* | 9/2019 | Lee | ..... | H04N 5/23245 |
| 10,509,459 B2* | 12/2019 | Lee | ..... | G06F 11/3089 |
| 2010/0194741 A1* | 8/2010 | Finocchio | ..... | G06T 7/269 |
| | | | | 345/419 |
| 2012/0294498 A1* | 11/2012 | Popovic | ..... | A61B 1/0005 |
| | | | | 382/128 |
| 2013/0063418 A1* | 3/2013 | Kaschalk | ..... | G06T 13/20 |
| | | | | 345/419 |
| 2015/0084967 A1* | 3/2015 | Finocchio | ..... | G06T 7/269 |
| | | | | 345/473 |
| 2015/0228103 A1* | 8/2015 | Kaschalk | ..... | G06T 15/005 |
| | | | | 345/419 |
| 2016/0325680 A1* | 11/2016 | Curtis | ..... | H04N 5/2628 |
| 2017/0177937 A1* | 6/2017 | Harmsen | ..... | G06K 9/00624 |
| 2017/0314930 A1* | 11/2017 | Monterroza | ..... | G06N 3/0454 |
| 2017/0336858 A1* | 11/2017 | Lee | ..... | G06F 3/005 |
| 2017/0339329 A1* | 11/2017 | Lee | ..... | H04N 13/254 |
| 2017/0374269 A1* | 12/2017 | Govindarao | ..... | G02B 7/38 |
| 2018/0232947 A1* | 8/2018 | Nehmadi | ..... | G01S 17/931 |
| 2018/0322689 A1* | 11/2018 | Bista | ..... | G06T 15/205 |
| 2019/0056498 A1* | 2/2019 | Sonn | ..... | G01S 17/931 |
| 2019/0154834 A1* | 5/2019 | Heidrich | ..... | G01S 17/894 |
| 2019/0279379 A1* | 9/2019 | Srinivasan | ..... | G06T 7/50 |
| 2019/0283760 A1* | 9/2019 | Jensen | ..... | B60W 50/00 |
| 2019/0356841 A1* | 11/2019 | Lee | ..... | H04N 5/2355 |

* cited by examiner

IMAGE DEVICE FOR GENERATING VELOCITY MAPS

CROSS REFERENCE TO RELATED APPLICATIONS

This application claims the benefit of U.S. Provisional Application No. 62/693,457, filed on Jul. 3, 2018 and entitled "VELOCITY MAP APPARATUS AND EFFICIENT MEMORY USAGE FOR ARBITRARY SHAPE IMAGE", the contents of which are incorporated herein by reference.

BACKGROUND OF THE INVENTION

1. Field of the Invention

The present invention relates to an image device, and particularly to an image device that can generate velocity maps.

2. Description of the Prior Art

Recently, optical flow is a hot topic in computer vision. The optical flow can show motion of objects included in an image. However, the optical flow is a 2-dimensional vector corresponding to the image. Therefore, the optical flow only shows 2-dimensional motion of the objects, rather than 3-dimensional motion corresponding to real world. So the optical flow is apparently not an ideal choice for obtaining 3-dimensional motion of the objects. Therefore, how to obtain the 3-dimensional motion of the objects is an important issue for a computer vision designer.

SUMMARY OF THE INVENTION

An embodiment of the present invention provides an image device for generating velocity maps. The image device includes an image capturing group, a depth map generator, an optical flow generator, and a velocity map generator. The image capturing group includes at least one image capturer, each image capturer of the image capturing group captures a first image at a first time and a second image at a second time. The depth map generator generates a first depth map according to the first image and a second depth map according to the second image. The optical flow generator generates first optical flow according to the first image and the second image. The velocity map generator generates a first velocity map according to the first depth map, the second depth map and the first optical flow, wherein the first velocity map corresponds to the first image, and the first velocity map comprises information corresponding to a velocity of each pixel of the first image.

An embodiment of the present invention provides an image device for generating velocity maps. The image device includes a velocity map generator. The velocity map generator receives a plurality of optical flow and a plurality of depth maps, wherein each optical flow of the plurality of optical flow corresponds to two depth maps of the plurality of depth maps, and the velocity map generator further calculates information corresponding to a velocity of each pixel corresponding to the each optical flow according to the each optical flow and the two depth maps to generate a velocity map corresponding to the two depth maps.

An embodiment of the present invention provides an image device for generating velocity maps. The image device includes a velocity map generator. The velocity map generator generates a plurality of velocity maps according to a plurality of optical flow and a plurality of depth maps, wherein each velocity map of the plurality of velocity maps relates to 3-dimensional displacements of pixels of the each velocity map within a time interval, wherein the 3-dimensional displacements are obtained according to the plurality of optical flow and the plurality of depth maps.

The image device provided by the present invention utilizes an image capturing group to capture a plurality of images at a corresponding time, utilizes a depth map generator to generate a plurality of depth maps according to the plurality of images, utilizes an optical flow generator to generate a plurality of optical flow according to the plurality of images, utilizes a velocity map generator to generate a plurality of velocity maps according to the plurality of depth maps and the plurality of optical flow, and utilizes an acceleration map generator to generate an acceleration map according to the plurality of velocity maps. Therefore, compared to the prior art, the present invention can obtain 3-dimensional motion of pixels corresponding to the plurality of images.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
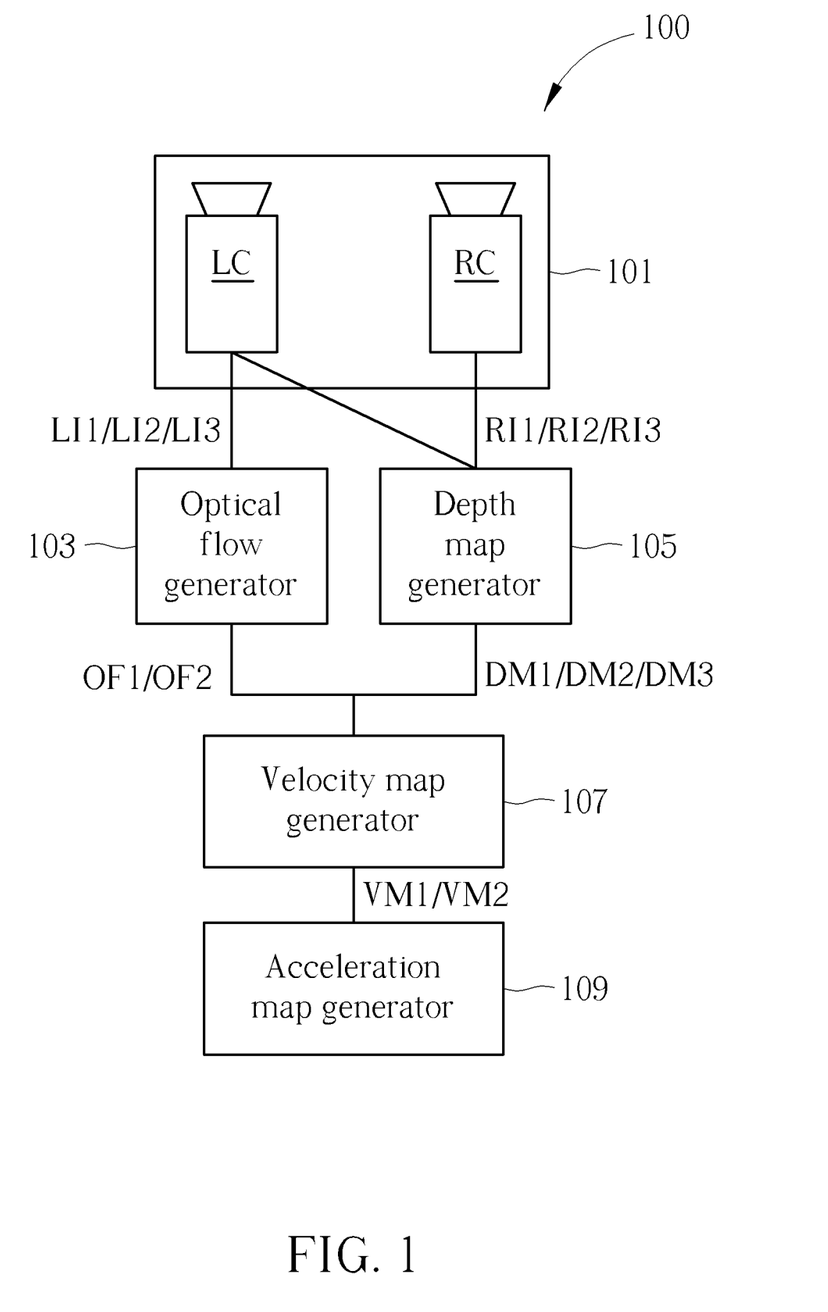
FIG. 1 is a diagram illustrating an image device according to a first embodiment of the present invention.

Please refer to FIG. 1. FIG. 1 is a diagram illustrating an image device 100 according to a first embodiment of the present invention. As shown in FIG. 1, the image device 100 includes an image capturing group 101, an optical flow generator 103, a depth map generator 105, a velocity map generator 107, and an acceleration map generator 109. However, the present invention is not limited to the image device 100 including the acceleration map generator 109. That is, in another embodiment of the present invention, the acceleration map generator 109 is optionally included in the image device 100. That is, in another embodiment of the present invention, the acceleration map generator 109 can be outside the image device 100. The image capturing group 101 can include two image capturers LC, RC, but the present invention is not limited to the image capturing group 101 including the two image capturers LC, RC. That is, the image capturing group 101 can include at least one image capturer. In addition, it is well-known to those of ordinary skill in the art that each image capturer of image capturing group 101 at least includes a lens and an image sensor (e.g. a charge-coupled device (CCD) image sensor, or a complementary metal-oxide-semiconductor (CMOS) image sensor).

Figure 2:
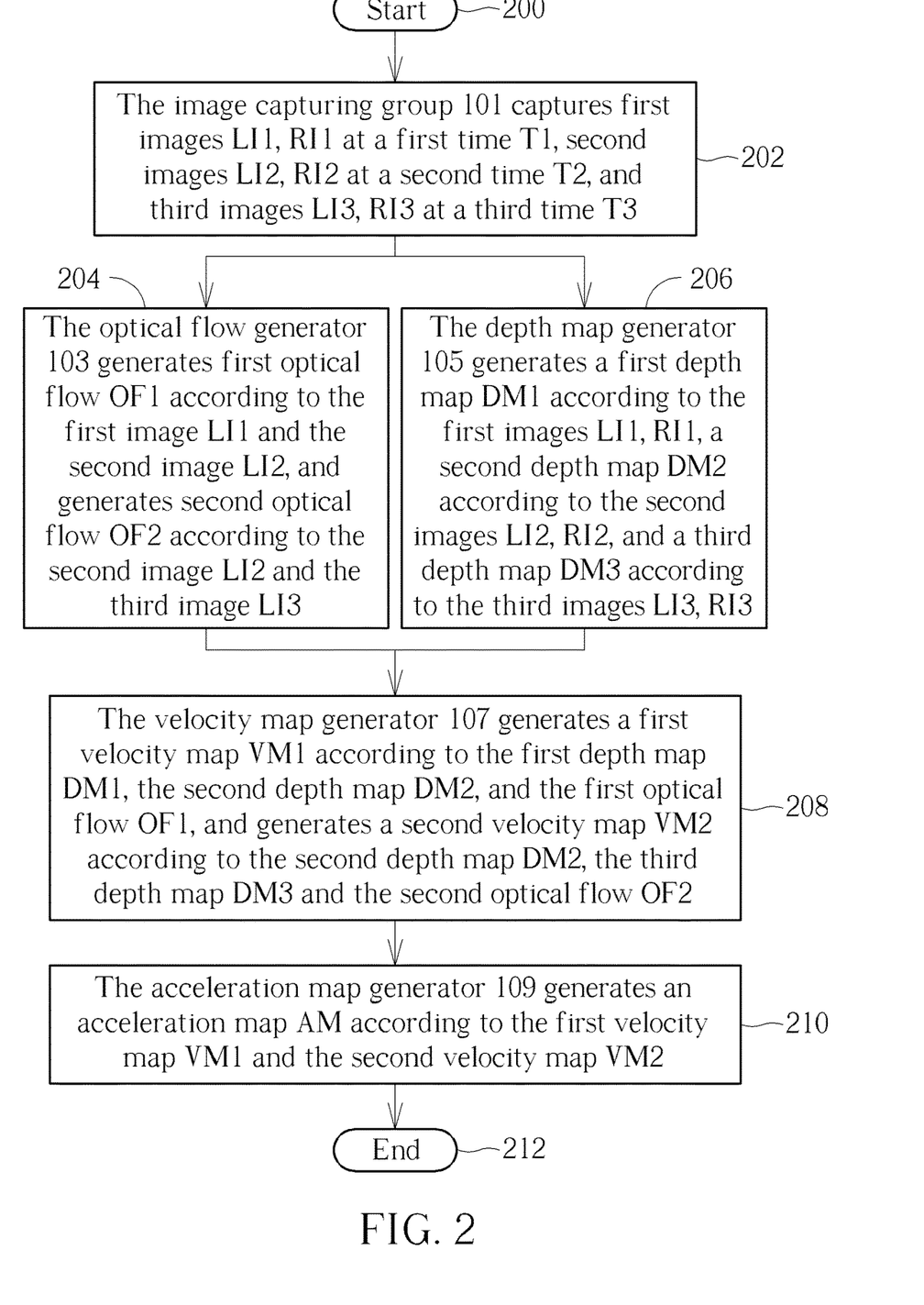
FIG. 2 is a flowchart illustrating a method of generating a velocity map according to a second embodiment of the present invention.

Please refer to FIG. 2. FIG. 2 is a flowchart illustrating an operation method of generating a velocity map according to a second embodiment of the present invention. In addition, the operation method in FIG. 2 is illustrated using the image device 100 in FIG. 1. Detailed steps are as follows:

Step 200: Start.

Step 202: The image capturing group 101 captures first images LI1, RI1 at a first time T1, second images LI2, RI2 at a second time T2, and third images LI3, RI3 at a third time T3.

Step 204: The optical flow generator 103 generates first optical flow OF1 according to the first image LI1 and the second image LI2, and generates second optical flow OF2 according to the second image LI2 and the third image LI3.

Step 206: The depth map generator 105 generates a first depth map DM1 according to the first images LI1, RI1, a second depth map DM2 according to the second images LI2, RI2, and a third depth map DM3 according to the third images LI3, RI3.

Step 208: The velocity map generator 107 generates a first velocity map VM1 according to the first depth map DM1, the second depth map DM2, and the first optical flow OF1, and generates a second velocity map VM2 according to the second depth map DM2, the third depth map DM3 and the second optical flow OF2.

Step 210: The acceleration map generator 109 generates an acceleration map AM according to the first velocity map VM1 and the second velocity map VM2.

Step 212: End.

Figure 3:
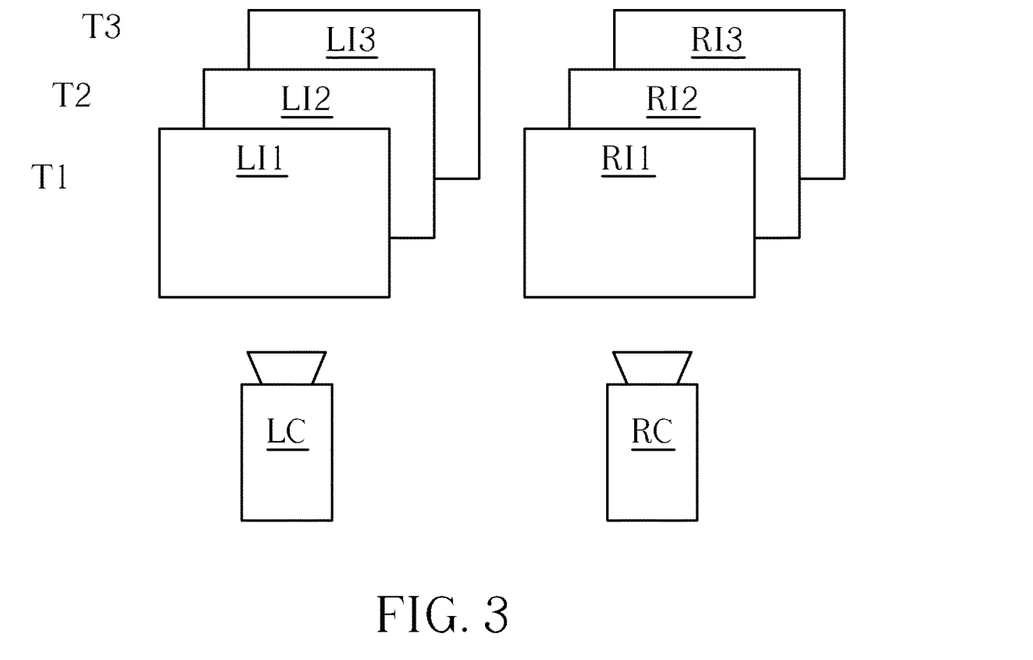
FIG. 3 is a diagram illustrating the first images, the second images, and the third images captured by the image capturing group at different times.

Please further refer to FIG. 3. FIG. 3 is a diagram illustrating the first images LI1, RI1, the second images LI2, RI2, and the third images LI3, RI3 captured by the image capturing group 101 at different times. In step 202, as shown in FIG. 3, the image capturer LC captures the first image LI1 at the first time T1, the second image LI2 at the second time T2, and the third image LI3 at the third time T3, wherein the second time T2 is before the first time T1, and the third time T3 is before the second time T2. Correspondingly, the image capturer RC captures the first image RI1 at the first time T1, the second image RI2 at the second time T2, and the third image RI3 at the third time T3.

In the embodiment shown in FIG. 1, the optical flow generator 103 is coupled to the image capturer LC for receiving the first image LI1, the second image LI2, and the third image LI3 captured by the image capturer LC, generating the first optical flow OF1 according to the first image LI1 and the second image LI2, and generating the second optical flow OF2 according to the second image LI2 and the third image LI3. But, the present invention is not limited to the optical flow generator 103 being coupled to the image capturer LC. In one embodiment of the present invention, the optical flow generator 103 can be coupled to the image capturer RC. Moreover, in another embodiment of the present invention, the optical flow generator 103 can be coupled to the image capturers LC and RC, such that occlusion errors can be avoided. For example, when the optical flow generator 103 is coupled to the image capturers LC, RC, if the image capturer LC is occluded, resulting in occluded areas existing in the first image LI1, the second image LF2, and the third image LI3, the optical flow generator 103 can directly utilize the first image RI1, the second image RI2, and the third image RI3 to generate the first optical flow OF1 and the second optical flow OF2.

Figure 4:
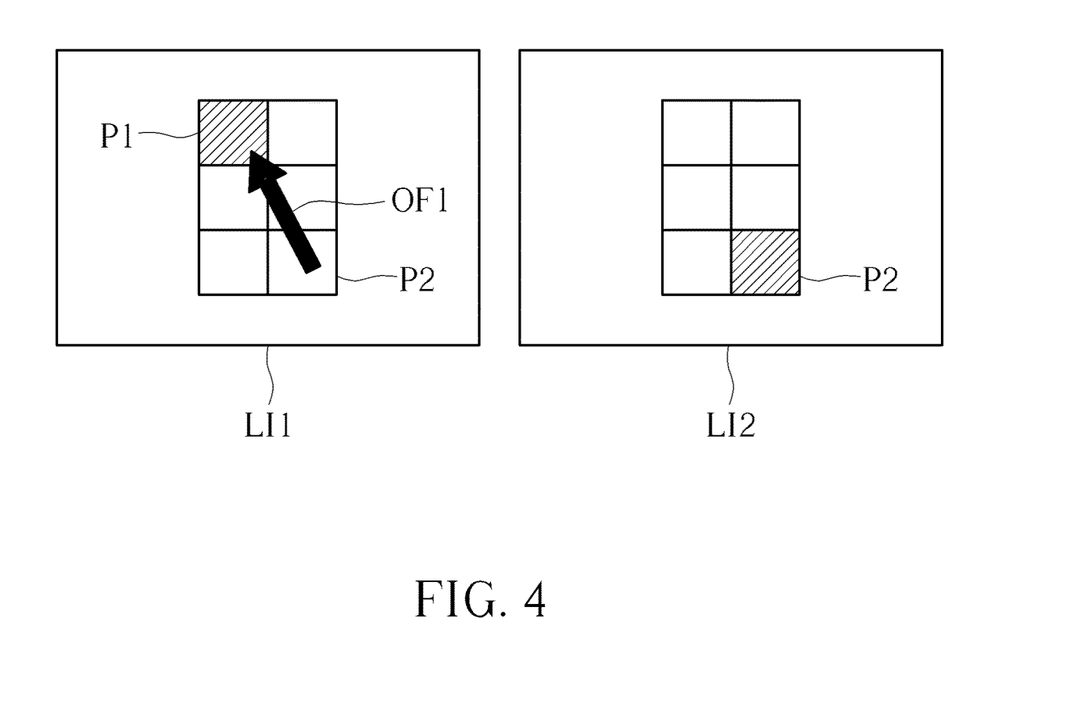
FIG. 4 is a diagram illustrating the first optical flow generated by the optical flow generator according to the first image and the second image.

In step 204, the first optical flow OF1 is used for indicating a vector of each pixel (e.g. a pixel P) of the first image LI1 from the second time T2 to the first time T1 (that is, a displacement of the pixel P from the second time T2 to the first time T1), wherein for example, the pixel P is located at a position P1($x_1$, $y_1$) of the first image LI1 and located at a position P2($x_2$, $y_2$) of the second image LI2. Please refer to FIG. 4. FIG. 4 is a diagram illustrating the first optical flow OF1 generated by the optical flow generator 103 according to the first image LI1 and the second image LI2. As shown in FIG. 4, because the second time T2 is before the first time T1, the optical flow generator 103 can generate the first optical flow OF1 according to the position P1($x_1$, $y_1$) of the first image LI1 and a corresponding position (that is, the position P2($x_2$, $y_2$)) in the second image LI2. That is, the optical flow OF1 is ($x_1$-$x_2$, $y_1$-$y_2$) or opposite direction ($x_2$-$x_1$, $y_2$-$y_1$). In addition, the second optical flow OF2 is used for indicating a vector of each pixel of the second image LI2 from the third time T3 to the second time T2, and an operation method related to the second optical flow OF2 can be referred to the above-mentioned operation method of the optical flow OF1 described of FIG. 4, so further description thereof is omitted for simplicity. In addition, the optical flow OF1 being generated according to the position P1($x_1$, $y_1$) of the first image LI1 and the position P2($x_2$, $y_2$) in the second image LI2 is well-known to those of ordinary skill in the art, so further description thereof is also omitted for simplicity.

In step 206, the depth map generator 105 generates the first depth map DM1 according to the first images LI1, RI1, the second depth map DM2 according to the second images LI2, RI2 and the third depth map DM3 according to the third images LI3, RI3, wherein the depth map generator 105 is coupled to the image capturers LC, RC. Because details of generating a depth map based on two images with a disparity between each other are well-known to those of ordinary skill in the art, further description thereof is omitted for simplicity.

The velocity map generator 107 is coupled to the depth map generator 105 and the optical flow generator 103. Therefore, in step 208, the velocity map generator 107 generates a first 3-dimensional coordinate of the position P1 and a second 3-dimensional coordinate of the position P2 according to the first optical flow OF1 of the pixel P, the first depth map DM1, and the second depth map DM2. Further, the velocity map generator 107 generates the first velocity map VM1 according to the first 3-dimensional coordinate of the position P1, the second 3-dimensional coordinate of the position P2, and a time interval between the first time T1 and the second time T2, wherein the first velocity map VM1 corresponds to the first image LI1 and is used for indicating a velocity of the pixel P from the second time T2 to the first time T1. However, in another embodiment of the present invention, the first velocity map VM1 is used for indicating information (e.g. v') corresponding to the velocity of the pixel P. For example, the information v' is represented by a function of the velocity of the pixel P (e.g. v'=F(v)), wherein the function F(v) can be an invertible polynomial function of velocity v, such as a linear function or a cubic function of velocity and so on. Also, the velocity of the pixel P can be obtained by an inverse function of F(v) (e.g. v=F$^{-1}$(v')). In other embodiments, the function F(v) can be in other forms of invertible operations, for example, a look-up table, an invertible matrix, and the like. In addition, in another embodiment of the present invention, the function F(v) is a compression function that can compress the velocity v to a compressed data, and the inverse function F$^{-1}$(v') is a decompression function corresponding to the function F(v).

Figure 5:
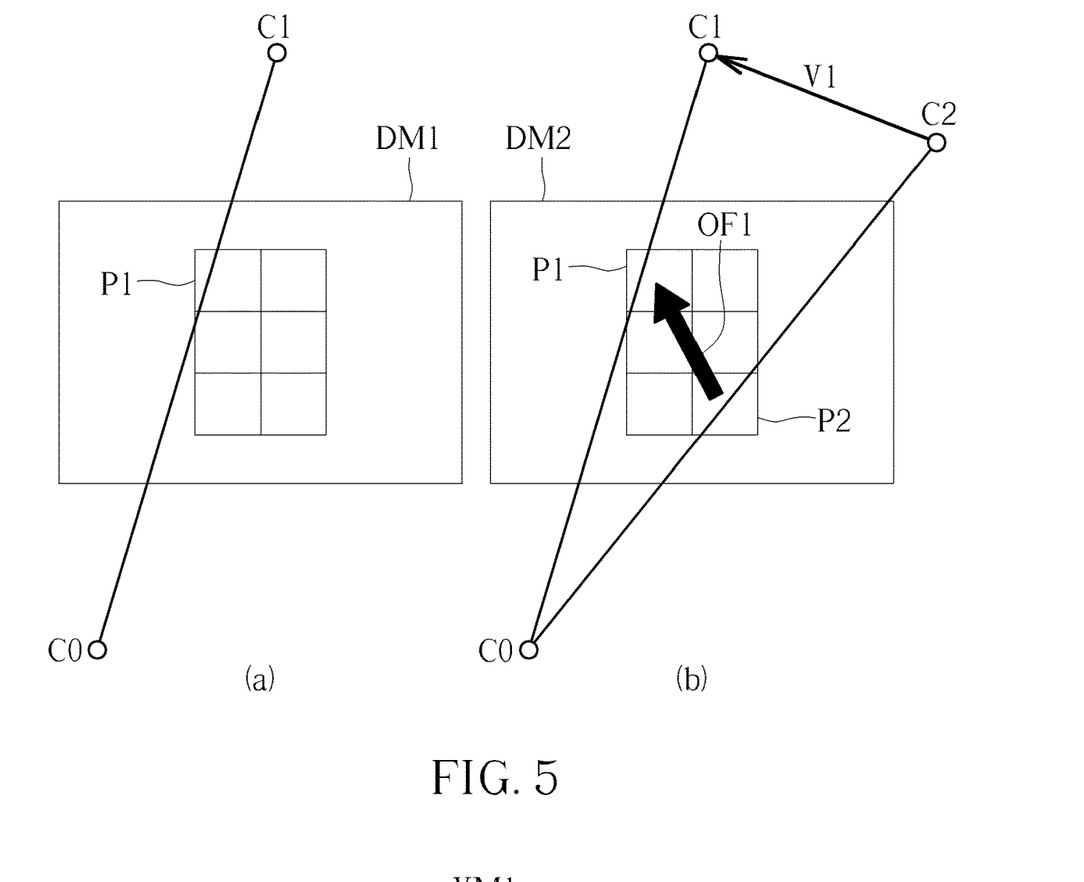
FIG. 5 is a diagram illustrating a first velocity of the first velocity map generated by the velocity map generator according to the first depth map, the second depth map, and the first optical flow.

In addition, in another embodiment, the information v' is represented by a 3-dimensional displacement of the pixel P from the second time T2 to the first time T1 and the time interval between the first time T1 and the second time T2. Please refer to FIG. 5. FIG. 5 is a diagram illustrating a first velocity V1($v_x$, vy, vz) of the first velocity map VM1 generated by the velocity map generator 107 according to the first depth map DM1, the second depth map DM2, and the first optical flow OF1. As shown in FIG. 5(a), the first depth map DM1 includes depth information of the pixel P at the position P1($x_1$, $y_1$). Therefore, by applying a 3-dimensional coordinate C0($X_0$, $Y_0$, $Z_0$) of an optical center to the first depth map DM1 and the position P1($x_1$, $y_1$), a 3-dimensional coordinate C1($X_1$, $Y_1$, $Z_1$) corresponding to the position P1($x_1$, $y_1$) can be generated. Likewise, as show in FIG. 5(b), the second depth map DM2 includes depth information of the pixel P at the position P2($x_2$, $y_2$), and a 3-dimensional coordinate C2($X_2$, $Y_2$, $Z_2$) corresponding to the position P2($x_2$, $y_2$) can be generated according to the above-mentioned corresponding descriptions of the 3-dimensional coordinate C1($X_1$, $Y_1$, $Z_1$). Therefore, the 3-dimensional displacement exists between the 3-dimensional coordinate C1($X_1$, $Y_1$, $z_1$) and the 3-dimensional coordinate C2($X_2$, $Y_2$, $Z_2$), and the first velocity V1($v_x$, $v_y$, $v_x$) of the pixel P can be generated according to the 3-dimensional displacement and the time interval between the first time T1 and the second time T2. In addition, the second velocity map VM2 can be generated according to the second depth map DM2, the third depth map DM3, and the second optical flow OF2 in a manner similar to the above-mentioned descriptions corresponding to the first optical flow OF1, so further description thereof is omitted for simplicity.

Figure 6:
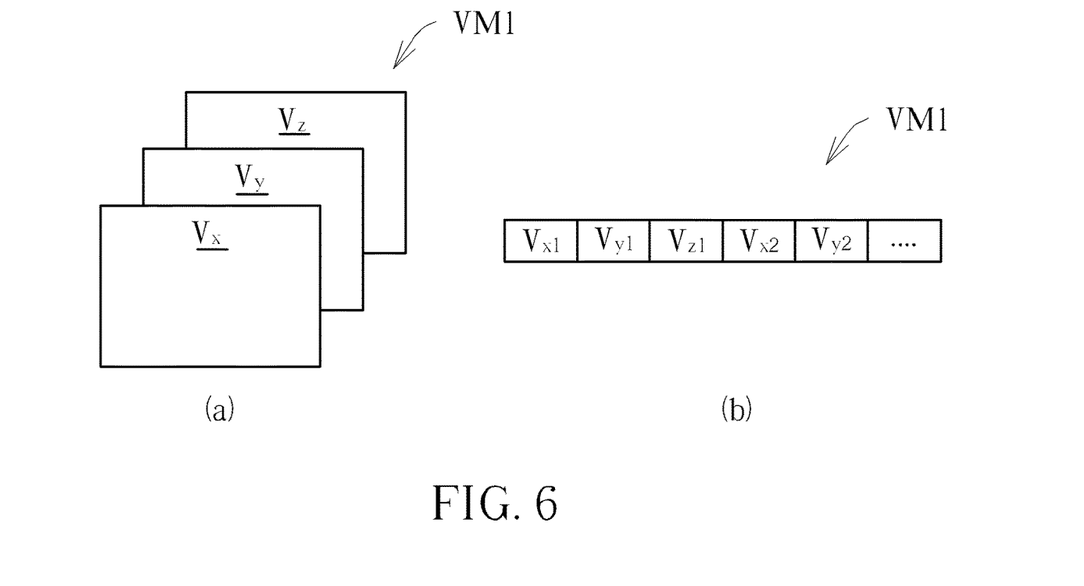
FIG. 6 is a diagram illustrating a data structure of the first velocity map.

In addition, because each velocity included in the first velocity map VM1 is composed of 3 elements $v_x$, $v_y$, $v_x$, data structure of the first velocity map VM1 to store the 3 elements $v_x$, $v_y$, $v_x$ can be defined in various way. Please refer to FIG. 6. FIG. 6 is a diagram illustrating a data structure of the first velocity map VM1, wherein the first velocity map VM1 can be stored in (a) a plane structure or (b) an interlace structure. For the plane structure, the first velocity map VM1 is divided into 3 element maps, wherein each element map of the 3 element maps is used for storing one of the 3 elements $v_x$, $v_y$, $v_x$. For the interlace structure, the 3 elements $v_x$, $v_y$, $v_x$ of the each velocity are stored sequentially.

Figure 7:
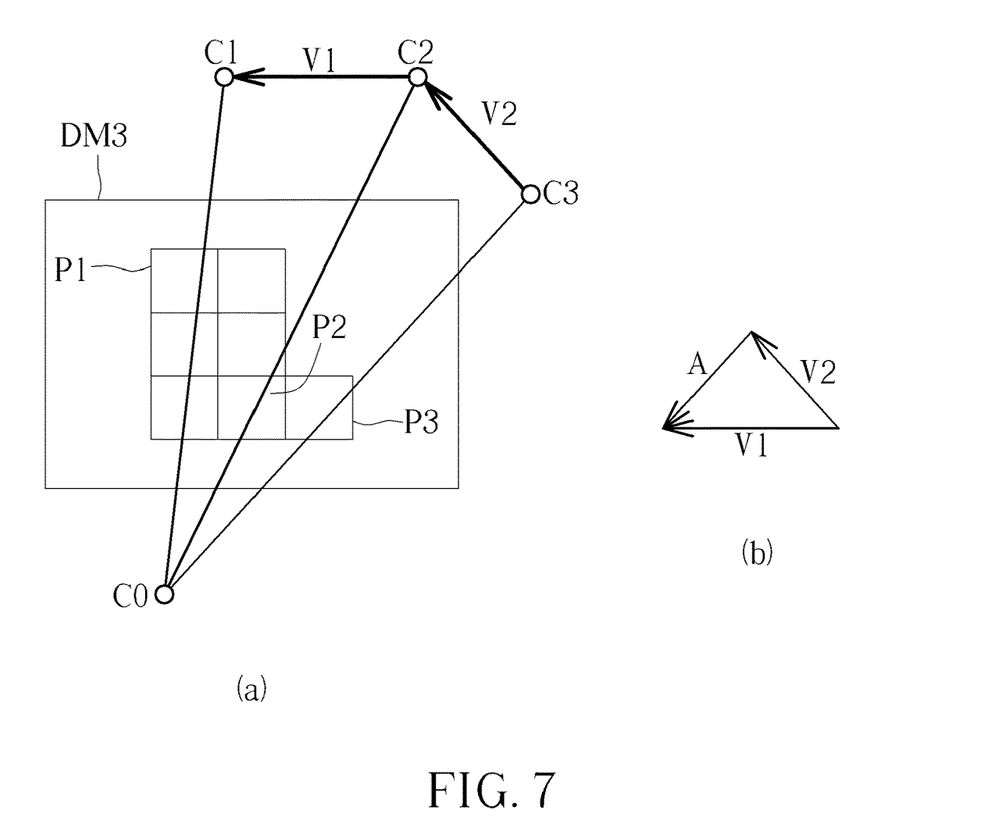
FIG. 7 is a diagram illustrating an acceleration of the acceleration map generated by the acceleration map generator according to first velocity map and the second velocity map.

The acceleration map generator 109 is coupled to the velocity map generator 107. Therefore, in step 210, the acceleration map generator 109 generates the acceleration map AM corresponding to the first image LI1 according to the first velocity map VM1 and the second velocity map VM2, wherein the acceleration map AM is used for indicating an acceleration of the pixel P from the third time to the first time. However, in another embodiment of the present invention, the acceleration map AM is used for indicating information a' corresponding to the acceleration of the pixel P. For example, the information a' is represented by a function of the acceleration of the pixel P (e.g. a'=F(a)). Also, the acceleration of the pixel P can be obtained by an inverse function of F(a) (e.g. a=F$^{-1}$(a')). Please refer to FIG. 7. FIG. 7 is a diagram illustrating an acceleration A(ax, ay, az) of the acceleration map AM generated by the acceleration map generator 109 according to the first velocity map VM1 and the second velocity map VM2. As shown in FIG. 7(a), the first velocity V1 indicates the velocity of the pixel P from the second time T2 to the first time T1, and a second velocity V2 indicates the velocity of the pixel P from the third time T3 to the second time T2, wherein the second velocity V2 is generated according to the coordinate C2($X_2$, $Y_2$, $Z_2$), a coordinate C3($X_3$, $Y_3$, $Z_3$), and a time interval between the second time T2 and the third time T3. Therefore, the acceleration map generator 109 can generate the acceleration A($a_x$, $a_y$, $a_z$) (as shown in FIG. 7(b)) of the pixel P from the third time T3 to the first time T1. In addition, a data structure of the acceleration map AM can be referred to the above-mentioned corresponding descriptions corresponding to the data structure of the first velocity map VM1, so further description thereof is omitted for simplicity.

Figure 8:
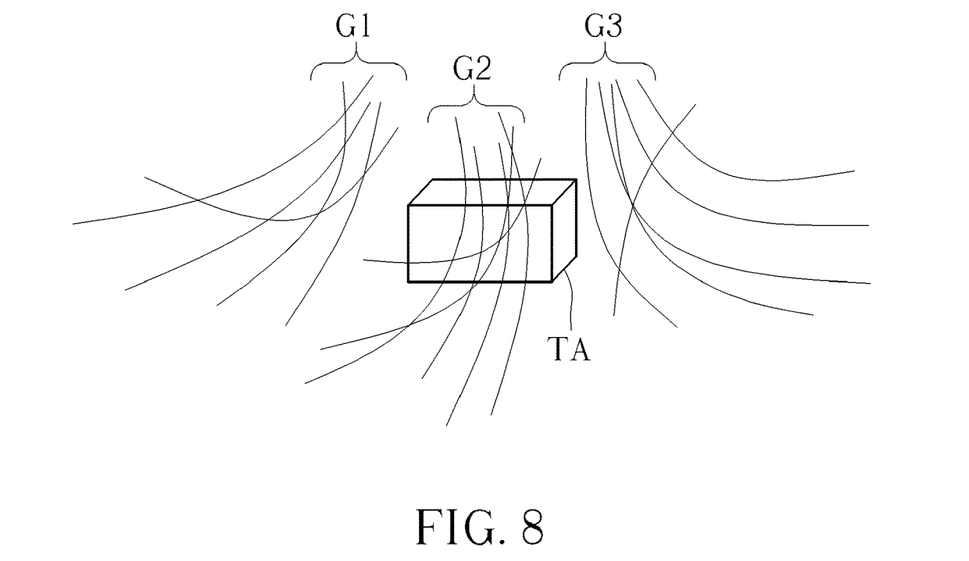
FIG. 8 is a diagram illustrating motions of a plurality of pixels predicted by the acceleration map generator.

Because the first depth map DM1, the first velocity VM1, and the acceleration map AM correspond to the first velocity V1($v_x$, $v_y$, $v_z$) and the acceleration A($a_x$, $a_y$, $a_z$) of the pixel P, motion and position of the pixel P can be predicted. Therefore, the first velocity map VM1 and the acceleration map AM can be used for collision alarm. In addition, the present invention is not limited to the first velocity map VM1 and the acceleration map AM being used for the collision alarm. That is, a jerk (a first derivative of acceleration) or a jounce (a second derivative of acceleration) of the pixel P can be further derived according to a plurality of acceleration maps for the collision alarm, wherein the plurality of acceleration maps and related velocity maps, depth maps, and images thereof can be generated according to the above-mentioned operation methods. Please refer to FIG. 8. FIG. 8 is a diagram illustrating motions of a plurality of pixels predicted by the acceleration map generator 109. As shown in FIG. 8, the motions of the plurality of pixels are predicted, wherein predicted paths of the plurality of pixels are depicted in a plurality of lines. A target area TA can be defined so that the collision alarm can be enabled by the acceleration map generator 109 when at least one line of the plurality of lines passes through the target area TA, which means that at least one pixel corresponding to the at least one line is predicted to run into the target area TA, and the collision alarm is enabled. However, in another embodiment of the present invention, because the first velocity map VM1 and the acceleration map AM include noises, a number of lines passing through the target area TA need to be greater than a predetermined number, the collision alarm is enabled.

Figure 9:
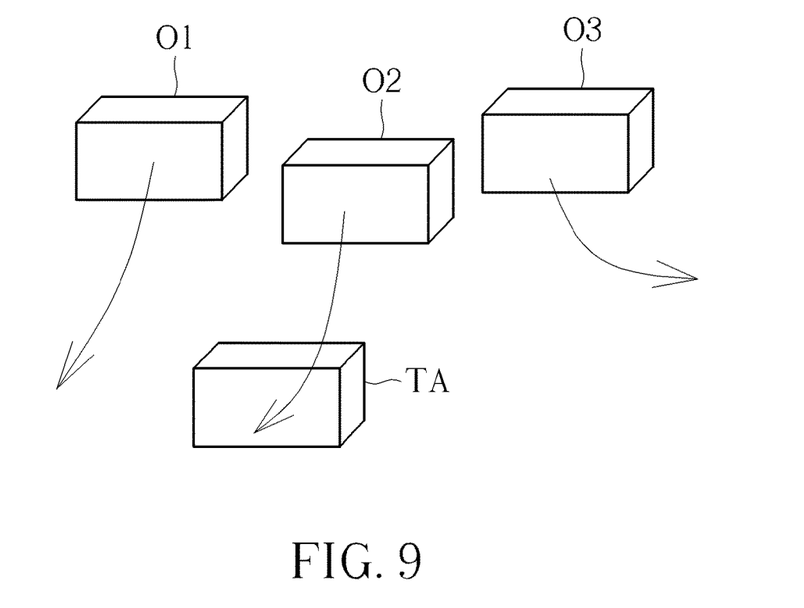
FIG. 9 is a diagram illustrating 3 objects detected by the acceleration map generator.

In addition, in another embodiment of the present invention, the acceleration map generator 109 detects at least one object according to the plurality of pixels. Specifically, the acceleration map generator 109 sorts the plurality of pixels according to at least one parameter of directions of the plurality of pixels, velocities of the plurality of pixels, and distances between two pixels of the plurality of pixels, and detects the at least one object according to sorted pixels. But, the present invention is not limited to the at least one parameter of directions of the plurality of pixels, velocities of the plurality of pixels, and distances between two pixels of the plurality of pixels, that is, the acceleration map generator 109 may sort the plurality of pixels and detect the at least one object according to other parameters. For example, as shown in FIG. 8, the acceleration map generator 109 may sort the plurality of pixels into 3 groups G1, G2, G3, and detects 3 objects O1, O2, O3 shown in FIG. 9. Also, the acceleration map generator 109 may enable the collision alarm according to motions of the objects O1, O2, O3. For example, the object O2 may run into the target area TA, so the acceleration map generator 109 can enable the collision alarm corresponding to the object O2. In addition, although the object O1 may not run into the target area TA, a predicted path of the object O1 is still near the target area TA, so the acceleration map generator 109 can enable another collision alarm (e.g. a reminder) corresponding to the object O1. Finally, because the object O3 is predicted to move away from the target area TA, the acceleration map generator 109 can neglect the object O3. In addition, in another embodiment of the invention, the above-mentioned operations can be executed by the velocity map generator 107 instead of the acceleration map generator 109, or executed by another processor (not shown in FIG. 1) different from the velocity map generator 107 and the acceleration map generator 109.

Figure 10:
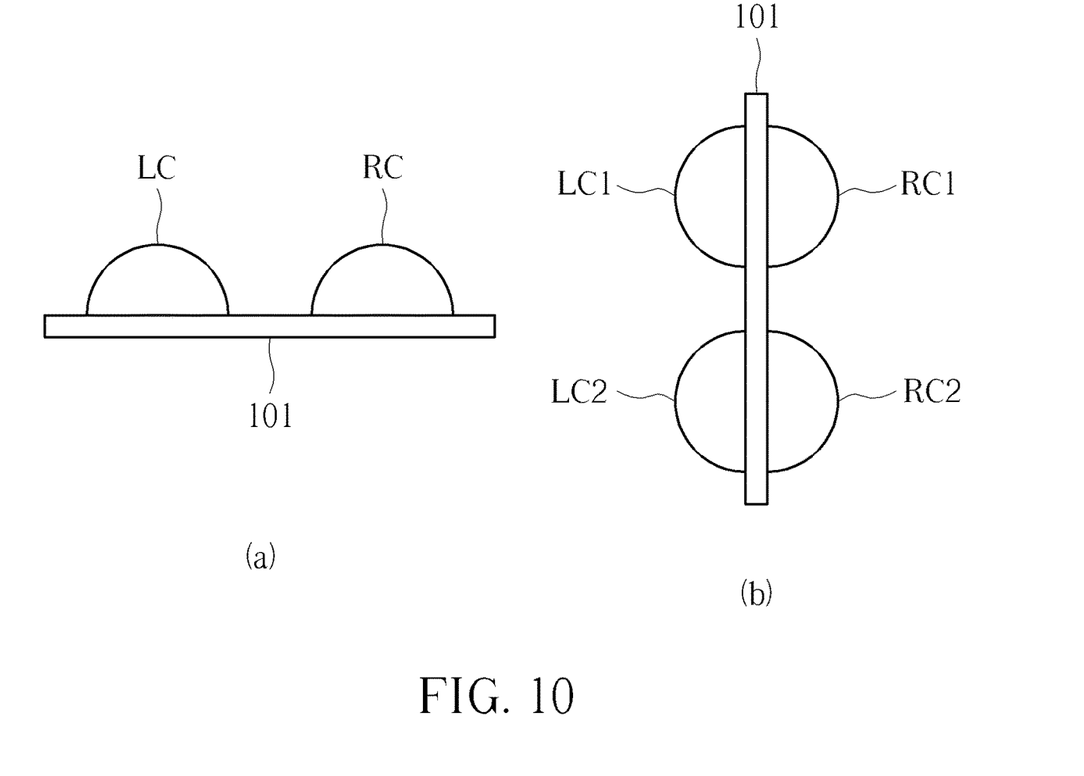
FIG. 10 is a diagram illustrating the each image capturer of the image capturing group being a fisheye image capturer according to another embodiment of the present invention.

Please refer to FIG. 10. FIG. 10 is a diagram illustrating the each image capturer of the image capturing group 101 being a fisheye image capturer according to another embodiment of the present invention. As shown in FIG. 10(a), the image capturers LC, RC are fisheye image capturers. As shown in FIG. 10(b), in another embodiment of the present invention, the image capturing group 101 includes 4 fisheye image capturers LC1, LC2, RC1, and RC2. Because a sum of view angles of the fisheye image capturers RC1 and LC1 is greater than 360 degrees, and a sum of view angles of the fisheye image capturers RC2 and LC2 is also greater than 360 degree, the image device 100 can be used for generating a 360 panoramic velocity map and a 360 panoramic acceleration map.

In addition, those of ordinary skill in the art should clearly realize functions of the optical flow generator 103, the depth map generator 105, the velocity map generator 107, and the acceleration map generator 109 through the above-mentioned corresponding descriptions of the optical flow generator 103, the depth map generator 105, the velocity map generator 107, and the acceleration map generator 109, so those of ordinary skill in the art can easily implement the optical flow generator 103, the depth map generator 105, the velocity map generator 107, and the acceleration map generator 109 through a field programmable gate array (FPGA) with the above-mentioned functions of the optical flow generator 103, the depth map generator 105, the velocity map generator 107, and the acceleration map generator 109, or an application-specific integrated circuit (ASIC) with the above-mentioned functions of the optical flow generator 103, the depth map generator 105, the velocity map generator 107, and the acceleration map generator 109, or a software module with the above-mentioned functions of the optical flow generator 103, the depth map generator 105, the velocity map generator 107, and the acceleration map generator 109, or an analog integrated circuit with the above-mentioned functions of the optical flow generator 103, the depth map generator 105, the velocity map generator 107, and the acceleration map generator 109. Therefore, further description of corresponding structures of the optical flow generator 103, the depth map generator 105, the velocity map generator 107, and the acceleration map generator 109 is omitted for simplicity.

Figure 11:
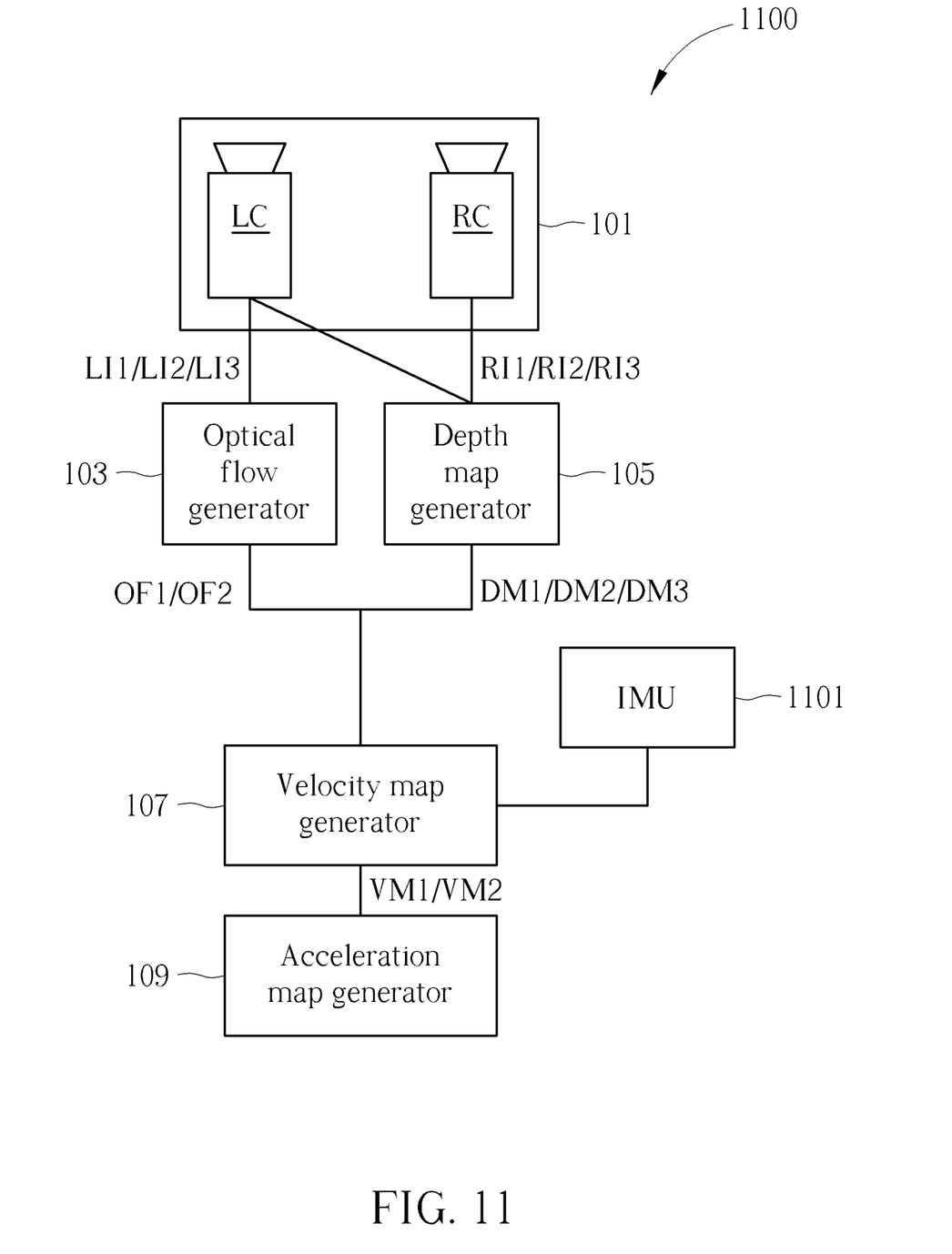
FIG. 11 is a diagram illustrating an image device according to a third embodiment of the present invention.
Figure 12:
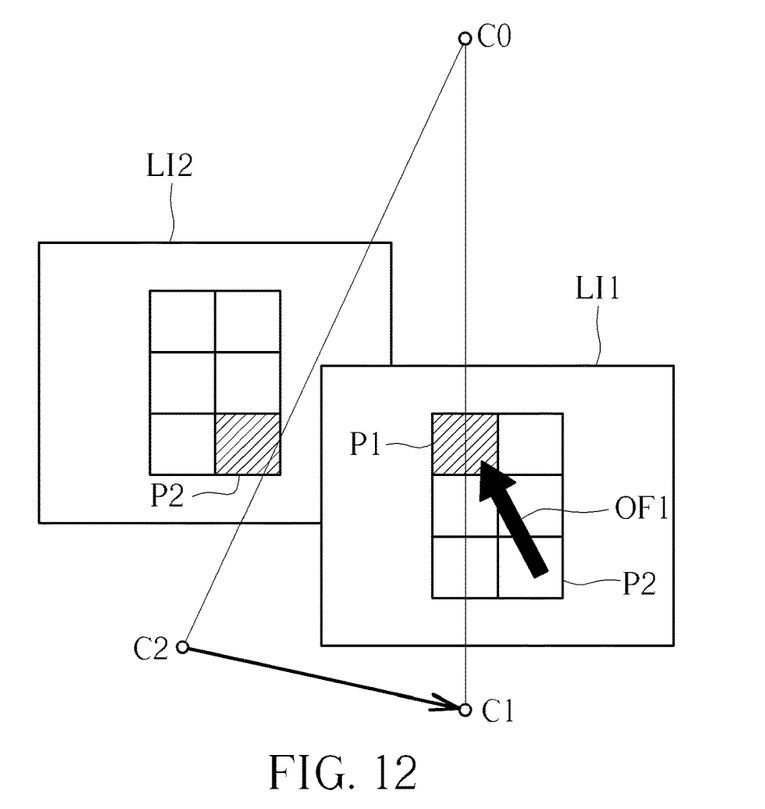
FIG. 12 is a diagram illustrating why the first velocity map and the second velocity map needs to be corrected according to the motion and the rotation of the image device.

Please refer to FIG. 11. FIG. 11 is a diagram illustrating an image device 1100 according to a third embodiment of the present invention. As shown in FIG. 11, a difference between the image device 100 in FIG. 1 and the image device 1100 is that the image device 1100 further includes an inertial measurement unit (IMU) 1101 coupled to the velocity map generator 107, wherein the IMU 1101 can include an accelerometer and a gyroscope for measuring motion and rotation of the image device 1100, respectively. In addition, the velocity map 107 further corrects the first velocity map VM1 and the second velocity map VM2 according to the motion and the rotation of the image device 1100. Please refer to FIG. 12. FIG. 12 is a diagram illustrating why the first velocity map VM1 and the second velocity map VM2 needs to be corrected according to the motion and the rotation of the image device 1100. As shown in FIG. 12, assume that a pixel P is at a 3-dimensional coordinate $C0(X_0, Y_0, Z_0)$, an optical center of the image capturing group 101 is at a 3-dimensional coordinate $C1(X_1, Y_1, Z_1)$ at a first time T1, and the optical center of the image capturing group 101 is at a 3-dimensional coordinate $C2(X_2, Y_2, Z_2)$ at a second time T2, resulting in the pixel P being located at a position $P1(x_1, y_1)$ of the first image LI1 and located at a position $P2(x_2, y_2)$ of the second image LI2. Because the position $P1(x_1, y_1)$ is different from the position $P2(x_2, y_2)$, an optical flow OF1 is generated even if the 3-dimensional coordinate $C0(X_0, Y_0, Z_0)$ is not moved. Therefore, the first velocity map VM1 and the second velocity map VM2 needs to be corrected according to the optical flow OF1 caused by motion and the rotation of the image device 1100. In addition, correcting the first velocity map VM1 and the second velocity map VM2 according to the motion and the rotation of the image device 1100 is well-known to those of ordinary skill in the art, so further description thereof is also omitted for simplicity.

Figure 13:
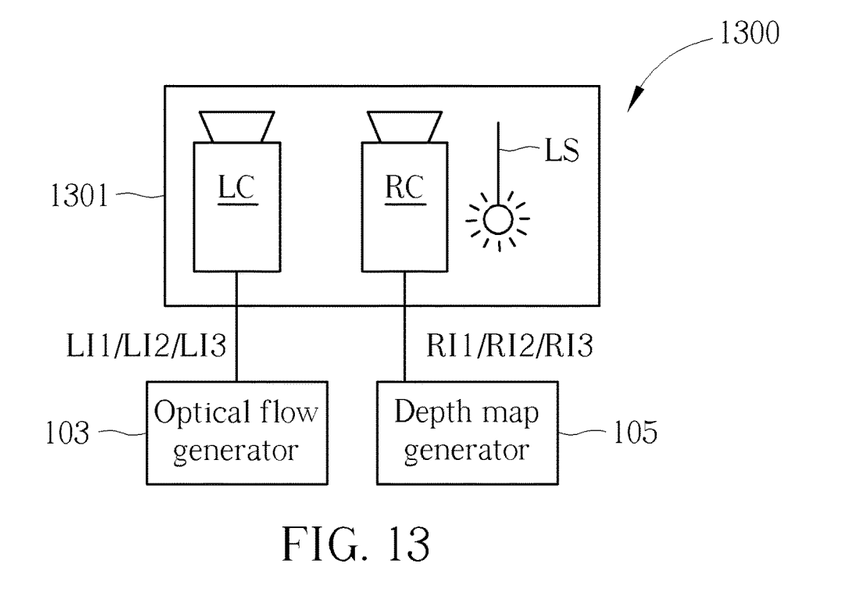
FIG. 13 is a diagram illustrating an image device according to a fourth embodiment of the present invention.

Please refer to FIG. 13. FIG. 13 is a diagram illustrating an image device 1300 according to a fourth embodiment of the present invention, wherein for simplifying the image device 1300, FIG. 13 only shows an image capturing group 1301, the optical flow generator 103, and the depth map generator 105. As shown in FIG. 13, differences between the image device 100 in the embodiment of FIG. 1 and the image device 1300 are that the image capturing group 1301 includes a light source LS, and the depth map generator 105 is coupled to a single image capturer (e.g. the image capturer RC as shown in FIG. 13), wherein the image capturer RC is used for capturing a first image RI1 and a second image RI2 including an emission light emitted by the light source LS, and the first image RI1 and the second image RI2 including the emission light are used for generating a first depth map DM1 and a second depth map DM2. In addition, the emission light emitted by the light source LS is structured light (or the emission light includes a random pattern), and the light source LS utilizes a collimator, at least one laser beam (e.g. at least one infrared laser beam), and at least one optical element (e.g. at least one diffraction optical element (DOE)) to generate the emission light. However, in another embodiment of the present invention, when the light source LS is a vertical-cavity surface-emitting laser (VCSEL), the light source LS optionally includes the collimator and the at least one optical element. That is, the collimator and the at least one optical element are not necessary for the light source LS.

In addition, in another embodiment of the present invention, the light source LS is applied to a time of flight (TOF), wherein when the light source LS is applied to the time of flight, the emission light is diffused laser light, that is, the emission light is uniform laser light. Therefore, a flying time corresponding to the emission light from the light source LS and reflecting through each object to the image capturer RC is used for generating the first depth map DM1 and the second depth map DM2, and meanwhile the image capturer RC is a time of flight sensor. In addition, subsequent operation principles of the image device 1300 are the same as those of the image device 100, so further description thereof is omitted for simplicity.

Figure 14:
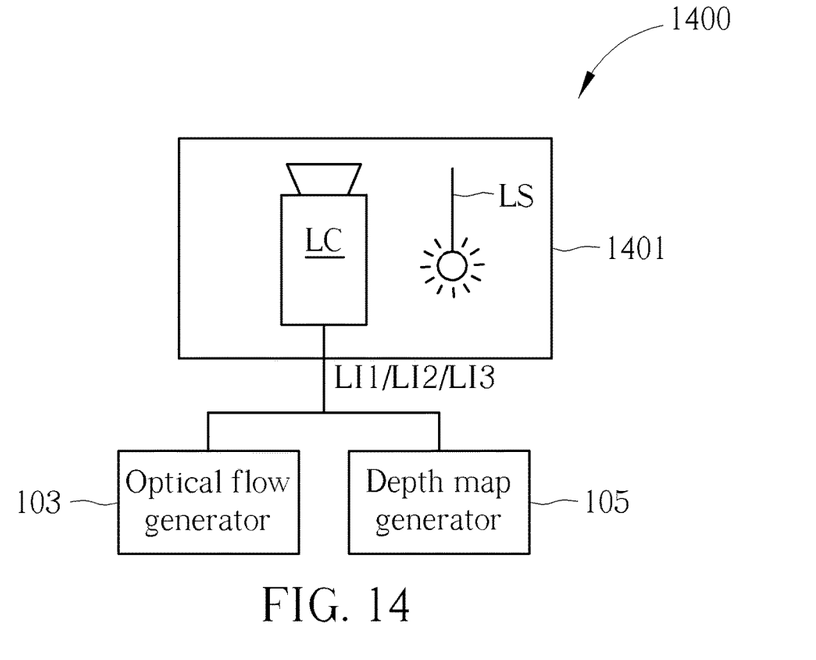
FIG. 14 is a diagram illustrating an image device according to a fifth embodiment of the present invention.

Please refer to FIG. 14. FIG. 14 is a diagram illustrating an image device 1400 according to a fifth embodiment of the present invention, wherein for simplifying the image device 1400, FIG. 14 only shows an image capturing group 1401, the optical flow generator 103, and the depth map generator 105. As shown in FIG. 14, differences between the image device 1300 and the image device 1400 are that the image capturing group 1401 only includes the image capturer LC, and the depth map generator 105 is coupled to the image capturer LC. In addition, when the light source LS is applied to the time of flight, a flying time corresponding to the emission light from the light source LS and reflecting through each object to the image capturer LC is used for generating a first depth map DM1 and a second depth map DM2, and meanwhile the image capturer LC is a time of flight sensor. In addition, besides sensing the flying time, the image capturer LC further senses a luminance signal, wherein the luminance signal corresponding to the emission light from the light source LS and reflecting through the each object to the image capturer LC is used for generating the first optical flow OF1 and the second optical flow OF2.

Figure 15:
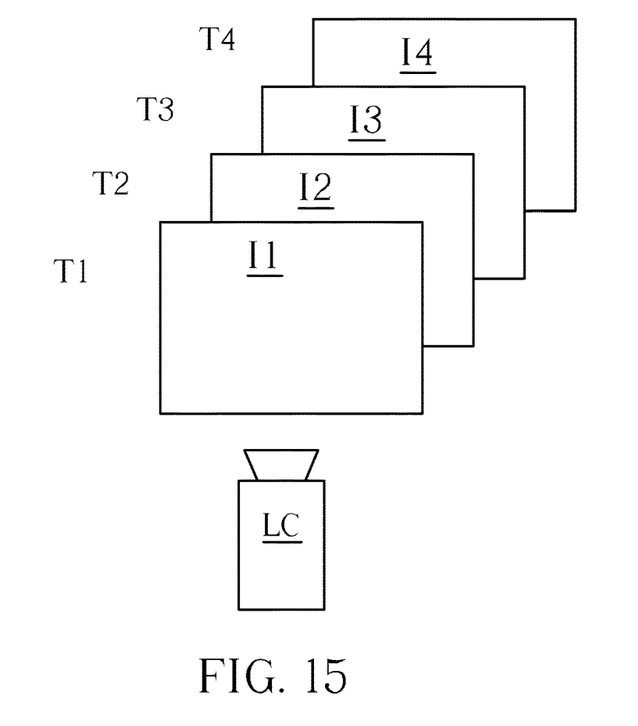
FIG. 15 is a diagram illustrating images captured by the image capturing group according to the time division multiplexing method.

However, when the emission light from the light source LS is the structured light, the image capturing group 1401, the optical flow generator 103, and the depth map generator 105 operate according to a time division multiplexing method. For example, please refer to FIG. 15. FIG. 15 is a diagram illustrating images I1, I2, I3, and I4 captured by the image capturing group 1401 according to the time division multiplexing method. The images I1, I2, I3, and I4 are captured at a first time T1, a second time T2, a third time T3, and a fourth time T4, respectively, wherein the light source LS is enabled at the first time T1 and the third time T3, and is disabled at the second time T2 and the fourth time T4. In addition, an infrared pass filter is applied to the image capturer LC when the emission light from the light source LS is the structured light. Therefore, a diffused infrared laser beam is enabled at the second time T2 and the fourth time T4, wherein the diffused infrared laser beam can further be generated by the light source LS or be another light source different from the light source LS. Therefore, the optical flow generator 103 can generate first optical flow OF1 according to the images I2, I4, and the depth map generator 105 can generate the first depth map DM1 according to the images I1, I3. Also, second optical flow OF2 and the second depth map DM2 also can be generated according to the above-mentioned operation methods corresponding to the first optical flow OF1 and the first depth map DM1. Moreover, subsequent operation principles of the image device 1400 are the same as those of the image device 100, so further description thereof is omitted for simplicity.

To sum up, the image device utilizes an image capturing group to capture a plurality of images at a corresponding time, utilizes the depth map generator to generate a plurality of depth maps according to the plurality of images, utilizes the optical flow generator to generate a plurality of optical flow according to the plurality of images, utilizes the velocity map generator to generate a plurality of velocity maps according to the plurality of depth maps and the plurality of optical flow, and utilizes the acceleration map generator to generate an acceleration map according to the plurality of velocity maps. Therefore, compared to the prior art, the present invention can obtain 3-dimensional motion of pixels corresponding to the plurality of images.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image device for generating velocity maps, comprising:
   an image capturing group comprising at least one image capturing circuit, each image capturing circuit of the image capturing group captures a first image at a first time and a second image at a second time;
   a depth map generation circuit coupled to the image capturing group for generating a first depth map according to the first image and a second depth map according to the second image;
   an optical flow generation circuit generating first optical flow according to the first image and the second image;
   a velocity map generation circuit coupled to the depth map generation circuit and the optical flow generation circuit for generating a first velocity map according to the first depth map, the second depth map and the first optical flow, wherein the first velocity map corresponds to the first image, and the first velocity map comprises information corresponding to a velocity of each pixel of the first image; and
   an acceleration map generation circuit coupled to the velocity map generation circuit;
   wherein the each image capturing circuit further captures a third image at a third time, and the third time is before the second time;
   the depth map generation circuit further generates a third depth map according to the third image;
   the optical flow generation circuit further generates second optical flow according to the second image and the third image;
   the velocity map generation circuit further generates a second velocity map according to the second depth map, the third depth map, and the second optical flow, wherein the second velocity map corresponds to the second image; and
   the acceleration map generation circuit generates an acceleration map corresponding to the first image according to the first velocity map, the second velocity map, the first time, and the third time, wherein the acceleration map comprises information corresponding to an acceleration of the each pixel of the first image.

2. The image device of claim 1, wherein the first optical flow is used for indicating a vector of the each pixel of the first image from the second time to the first time, and the second time is before the first time.

3. The image device of claim 1, wherein the velocity map generation circuit generates a first coordinate of the each pixel corresponding to the first time and a second coordinate of the each pixel corresponding to the second time according to the first optical flow of the each pixel, the first depth map and the second depth map, and the velocity map generation circuit further generates the first velocity map according to the first coordinate and the second coordinate, wherein the first velocity map is used for indicating a velocity of the each pixel of the first image from the second time to the first time.

4. The image device of claim 1, wherein the first image, the second image and the third image correspond to an image capturing circuit of the image capturing group, and the image capturing circuit is coupled to the optical flow generation circuit.

5. The image device of claim 1, wherein the image capturing group further includes a light source, and the light source is used for emitting emission light.

6. The image device of claim 5, wherein images comprising the emission light captured by the each image capturing circuit of the image capturing group or flying time corresponding to the emission light from the light source and reflecting through each object to the each image capturing circuit are used for generating the first depth map and the second depth map.

7. The image device of claim 6, wherein when the images comprising the emission light captured by the each image capturing circuit are used for generating the first depth map and the second depth map, the emission light is structured light.

8. The image device of claim 1, wherein the velocity map generation circuit further corrects the first velocity map according to motion and rotation of the image device.

9. The image device of claim 8, further comprising:
an inertial measurement unit coupled to the velocity map generation circuit for measuring the motion or the rotation of the image device and outputting the motion and the rotation of the image device to the velocity map generation circuit.

10. The image device of claim 1, wherein the each image capturing circuit of the image capturing group is a fisheye image capturer.

11. An image device for generating velocity maps, comprising:
a velocity map generation circuit receiving a plurality of optical flow and a plurality of depth maps, wherein each optical flow of the plurality of optical flow corresponds to two depth maps of the plurality of depth maps; and
an acceleration map generation circuit coupled to the velocity map generation circuit for calculating information corresponding to an acceleration of each pixel according to two velocity maps of a plurality of velocity maps generated by the velocity map generation circuit according to the plurality of optical flow and the plurality of depth maps to generate an acceleration map corresponding to the two velocity maps;
wherein the velocity map generation circuit further calculates information corresponding to a velocity of each pixel corresponding to the each optical flow according to the each optical flow and the two depth maps to generate a velocity map corresponding to the two depth maps.

12. The image device of claim 11, wherein the two depth maps correspond to two different times, respectively.

13. The image device of claim 12, wherein the each optical flow is used for indicating a displacement of the each pixel between the two different times.

14. The image device of claim 13, wherein the velocity map generation circuit converts the displacement of the each pixel into a displacement according to the two depth maps to calculate the information corresponding to the velocity of the each pixel.

15. An image device for generating velocity maps, comprising:
a velocity map generation circuit generating a plurality of velocity maps according to a plurality of optical flow and a plurality of depth maps, wherein each velocity map of the plurality of velocity maps relates to displacements of pixels of the each velocity map within a time interval, wherein the displacements are obtained according to the plurality of optical flow and the plurality of depth maps; and
an acceleration map generation circuit coupled to the velocity map generation circuit for generating a plurality of acceleration maps according to the plurality of velocity maps, wherein each acceleration map of the plurality of acceleration maps relates to second derivative of the displacements of the pixels corresponding to the time interval.

16. The image device of claim 15, wherein the each velocity map corresponds to an optical flow of the plurality of optical flow and two depth maps of the plurality of depth maps, and the optical flow and the two depth maps correspond to the time interval.

17. The image device of claim 16, wherein the velocity map generation circuit generates the each velocity map according to the optical flow and the two depth maps.

* * * * *